United States Patent [19]

Burnett

[11] Patent Number: 5,588,166
[45] Date of Patent: Dec. 31, 1996

[54] MEDICAL ATTACHMENT DEVICE

[76] Inventor: John Burnett, 1009 #B Constitution Ave. NE., Washington, D.C. 20002

[21] Appl. No.: 368,439

[22] Filed: Jan. 4, 1995

[51] Int. Cl.⁶ ................................. F16L 3/08
[52] U.S. Cl. ..................... 5/503.1; 5/658; 248/214
[58] Field of Search ............. 5/658, 503.1, 663; 248/214, 229.13, 229.23, 230.4, 231.51, 316.5, 201

[56] References Cited

U.S. PATENT DOCUMENTS

| | | | |
|---|---|---|---|
| 2,913,740 | 11/1959 | Eldridge | 5/503.1 |
| 3,899,149 | 8/1975 | Schneider | 5/658 |
| 4,511,158 | 4/1985 | Varga | 5/658 |
| 4,593,422 | 6/1986 | Wolpert | 5/503.1 |
| 4,815,686 | 3/1989 | Sanchez | 5/658 |
| 4,840,391 | 6/1989 | Schneider | 248/231.51 |
| 5,149,036 | 9/1992 | Sheehan | 5/658 |

*Primary Examiner*—Flemming Saether
*Attorney, Agent, or Firm*—Marion P. Lelong

[57] ABSTRACT

A medical attachment device is described that is hung upon and rigidly attached to an upright and horizontally disposed part of a patient transport vehicle and that also grasps an upright pole of a wheeled patient care apparatus for maintaining the vehicle and the apparatus in fixed spatial relationship while both are being moved by a single medical attendant.

5 Claims, 4 Drawing Sheets

MEDICAL ATTACHMENT DEVICE

BACKGROUND OF THE INVENTION

1. Field of the Invention

This invention relates to medical devices and particularly relates to medical attachment devices for transporting patients within hospitals while maintaining treatment of the patient. It especially relates to devices for interconnecting a wheeled patient transport vehicle and an auxiliary treatment apparatus, such as a wheeled support stand, while both are being moved by a single attendant.

2. Review of the Prior Art

Because of the dynamic nature of the hospital environment, patients are frequently being moved from one place to another, such as from the patient's room to radiology and then to a diagnosis area. In particular, a patient must often be transported along with an auxiliary apparatus that is needed by the patient. A typical wheeled auxiliary apparatus is a patient care apparatus, such as a wheeled I.V. support stand having an upstanding pole attached to crossed legs resting on castors and supporting an intravenous liquid feeding source and a volumetric pump which comprises a self-contained metering device for accurately metering the rate of flow of fluid from the liquid source to the patient. These metering devices are quite expensive and subject to damage if they are dropped or if the pole is tipped over. Such a wheeled support stand is hereinafter termed a "poly", regardless of its cargo.

Two attendants are usually required to move a patient and his poly when on intravenous feeding, for example. One of the attendants pushes the patient's wheelchair, wheeled bed, movable cart, or gurney, and the other attendant steadies the poly alongside the patient. This procedure is obviously a waste of valuable personnel.

In an emergency situation when only one person is responsible for both a patient transport vehicle and a poly, the manipulation problem can become acute. Quite often the single attendant has to push the patient transport vehicle as well as the poly while navigating uneven floors and inclines, pushing elevator buttons, opening doors, and the like.

U.S. Pat. No. 3,709,372 of Alexander is directed to an apparatus for supporting intravenous supply bottles that comprises an upright standard and a cross bar extending substantially horizontally across the top of the standard. The bottle is hung on the cross bar, and the upright standard is fastened to the stretcher by a mounting clamp.

U.S. Pat. No. 4,431,206 of Bryer is directed to an apparatus for carrying oxygen bottles and intravenous containers on the back of a wheelchair.

U.S. Pat. No. 4,511,157 of Wilt, Jr. discusses a device for interconnecting a wheelchair and a portable IV stand. The apparatus comprises an elongate rectangular member which is hollow; it is horizontally disposed and clamped to vertically disposed frame members of the wheelchair along one side thereof. An elongate rectangular rod is inserted into this member and into an interconnecting clamping device which is also attached to the vertical pole of the IV stand.

U.S. Pat. No. 4,511,158 of Varga et al is directed to a device for attaching a wheeled transport pole to a wheeled patient transport vehicle. The device comprises a bracket that is attached to the patient transport vehicle and a traction clamp which is attached to the transport pole. The bracket and the clamp are connected by a horizontally disposed rod member.

U.S. Pat. No. 4,572,536 of Doughty discusses a coupling that rigidly connects an intravenous feeding bottle support to a wheelchair or to a wheeled bed or stretcher. This coupling is L-shaped and comprises a detachable clamp at one end for engaging the vertical pole of the intravenous feeding bottle support and a telescoping extension comprising a tubular member or rod which slidably fits into the open end of a tube which is attached to the wheelchair for axial movement into and out of the tube.

U.S. Pat. No. 4,767,131 of Springer et al is directed to a hospital utility pole clamp that is plate-shaped, with multiple holes near one end for selectively mounting the plate onto the frame of the wheelchair, and a frictional mechanical connection at the other end for engaging the pole of the wheeled utility device, thereby attaching an IV, hung from the wheeled utility apparatus, to the wheelchair. The frictional connection is provided by a variable cam.

U.S. Pat. No. 4,840,391 of Schneider provides a device having an elongated and preferably telescopingly adjustable member having at one end thereof a latch engaging the vertically extending pole or standard of a free-wheeling IV mechanism, and a mechanism on the opposite end thereof for attaching the IV mechanism to a wheeled patient vehicle, preferably a wheelchair. The means for latchingly engaging the vertically extending pole or standard comprises a symmetrical pair of hingedly joined hemicylindrical pieces which are adapted to encircle the pole or standard.

U.S. Pat. No. 4,945,592 of Sims et al is directed to a coupling device for a patient transport vehicle, such as a gurney, hospital bed, or wheelchair, and a patient care apparatus, such as an intravenous assembly or a diagnostic or therapeutic apparatus. This coupling device comprises a vertically adjustable first horizontal flange secured to the patent transport device, an elongate vertical member supporting the patient care device, and a second horizontal flange disposed on an upper portion of the vertical member of the patient care apparatus.

U.S. Pat. No. 5,009,442 of Schneider describes an elongated and telescopingly adjustable member, having at one end thereof a symmetrical pair of hingedly joined hemicylindrical pieces for latchingly engaging the vertically extending pole or standard of a free-wheeling IV mechanism, and clamps in the vicinity of the opposite end thereof for attaching the IV mechanism to a wheelchair.

All of these inventions address the manipulation problem created when both a wheeled patient transport vehicle and a wheeled auxiliary apparatus must be moved synchronously by a single attendant. Nevertheless, a compact device is needed that can provide rigid attachment between a patient transport vehicle and an auxiliary apparatus during synchronous movement thereof while being simple to use, quickly attachable, and quickly removable so that the difficult and arduous task for a single attendant of transporting a patient with a poly can be expedited and simplified.

SUMMARY OF THE INVENTION

It is therefore an object of this invention to provide a medical attachment device that facilitates the transportation of a patient synchronously with an auxiliary treatment apparatus required by the patient.

It is another object of the invention to provide a medical attachment device that can quickly grip and quickly release various types of patient transport equipment and auxiliary apparatuses and devices.

It is still another object of the invention to provide a medical attachment device that is simple and compact.

In accordance with these objects and the principles of this invention, a medical attachment device is provided for rigidly connecting an auxiliary medical apparatus to a patient transport vehicle that may be a wheeled stretcher, hospital bed, gurney or wheelchair. This attachment device comprises: A) a holding member having a pair of flat sides for gripping the footboard or headboard of a wheeled stretcher, hospital bed, gurney, or wheelchair that is inserted between these sides, the member being J-shaped or U-shaped in the mid-section thereof, at least one of these sides having a width greater than the distance between the sides, and one of the flat sides being designated, according to nearness to the patient, as an inner flat side and the other being designated as an outer flat side; and B) a grasping means that is attached to the outer flat side for grasping the upright pole of a poly and for maintaining the pole in its fixed spatial relationship to the vehicle. The J-shaped or U-shaped member may be constructed of either metal or plastic. At least one knurled knob is threadedly attached to one of the flat sides so that pressure is applied upon the headboard or footboard to grip it between the flat sides.

The inner flat side preferably has greater width than depth, width being measured horizontally along the part of the vehicle that is being gripped, and depth being measured vertically in the plane of the flat side. The outer flat side preferably has greater depth than width.

The grasping means in one embodiment is a cylinder, having a pair of spring-loaded hemicylindrical leaves, which is attached to the outer flat side and aligned longitudinally therewith. The pole of a poly is easily slipped into the cylinder as at least one hemicylindrical leaf is pressed open.

In a second embodiment, a pair of holding clips is attached to and disposed in vertical alignment, when in use, along the length of the outer flat side, and a pair of pins are inserted through the clips so that the pole of a poly is enclosed therewithin, or, alternatively, a short length of chain is attached at one end to one side of a clip and at the other end to a bar that can be inserted into and through a pair of holes in the clip.

In a third embodiment, the grasping means is a pair of clips which are disposed in longitudinal alignment on the outer flat side. Each clip comprises a base, rigidly attached to the outer flat side, and a pair of resilient clip leaves which enclose and hold a pole of a poly when it is shoved therein.

In a fourth embodiment, the grasping means is a pair of traction clamps which are disposed in longitudinal alignment on the outer flat side. Each clamp comprises a base which is rigidly attached to the outer flat side, a fixed half-clamp which extends rigidly from the base and has a slot at its outer end, a half-clamp which is hingedly attached to the base, and a knurled knob which is pivotally attached to the outer end of the hinged half-clamp so that it can be swung into the slot, whereby the pole of a poly is held vertically within the pair of traction clamps.

In a fifth embodiment, the grasping means is a U-shaped member, elongated and aligned with the depth of the outer flat side, and a pair of pins that are inserted through the sides of the U-shaped member so that the pole of a poly is enclosed therewithin. The U-shaped member preferably has an interior semicircular shape and is integrally molded with the outer flat side.

In a sixth embodiment, the same U-shaped member is provided with a pair of slots, disposed inside its sides and near the outer edges thereof, and an elongated slide having a pair of lugs that are also near its edges and that fit into the slots. Both the U-shaped member and the slide have semicircular interior shapes in facing relationship, thereby forming a cylindrical opening within which the pole of a poly readily fits.

In an embodiment that provides a substitute for a footboard on a wheelchair, as a means for using the medical attachment device of this invention, a sleeve is attached to frame members of the wheelchair with clamps, and a rod is selectively positioned slideably within the sleeve, being held in a selected position with a set screw. The substitute, in the form of a flat toeboard, is rigidly and perpendicularly attached to the outer end of the rod. Any embodiment described hereinbefore may be dropped onto the toeboard, with the inner flat side nearer to the patient, and held in place with the at least one knurled knob.

In a seventh embodiment, a cross-folded attachment device is provided that comprises an inner flat side, a narrow top side, an outer flat side having a pair of cross-folded ridges, and a pair of flat-sided pole clamps mounted in vertical alignment, when in use, on the flat outer surfaces of the ridges. Each pole clamp comprises a hat-shaped member having a central base which is rigidly attached to the flat surface of a ridge, a pair of flat outer leaves straddling the base and outwardly spaced therefrom, and a swivel plate which is pivotably attached to one leaf and is fastened to the other leaf after the pole of a poly is placed within the clamp.

Any previously described holding member may be combined with any previously described grasping means to form a suitable attachment device of this invention. Each grasping member embodiment holds a pole of a poly loosely, thereby permitting up-and-down movements of the pole in relation to the grasping member, as the vehicle and the poly travel over the floors of corridors and into elevators.

BRIEF DESCRIPTION OF THE DRAWINGS

The advantages and novel features of the invention will be more fully apparent from the following detailed descriptions when read in connection with the accompanying drawings in which.

DESCRIPTION OF THE PREFERRED EMBODIMENTS

Figure 1:
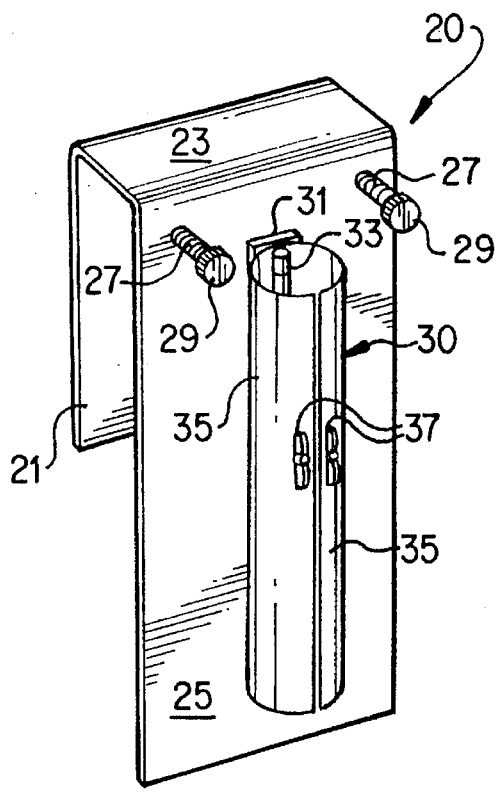
FIG. 1 is an isometric view that displays the medical attachment device of this invention, comprising a J-shaped member having a spring-loaded cylindrical clip, attached to the longer and outer flat side of the J-shaped member, into which the upright pole of a poly is fitted.
Figure 5:
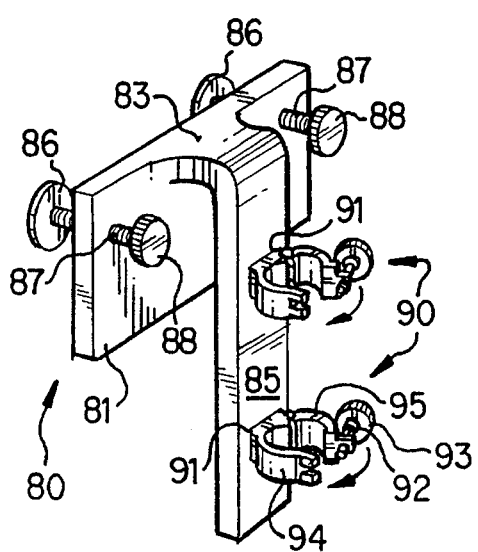
FIG. 5 is an isometric view of a J-shaped member having a pair of hinged clips attached in longitudinal alignment along its longer flat side for receiving the upright pole of a poly.

As shown in FIG. 1, medical attachment device 20 comprises inner flat side 21, top 23, outer flat side 25, and a pair of screws 27 with knurled knobs 29 which are threadedly attached to flat side 25 for pressing against a headboard or footboard of a hospital bed or gurney and thereby against the opposed inner flat side. Flat metal plates, exemplified by holding plates 88 in FIG. 5, are attached to the ends of screws 27 but are not visible in FIG. 1. Inner and outer sides 21, 25 are thus designated with reference to the stretcher, bed, gurney, or wheelchair, i.e., inner side 21 is closer thereto than outer side 25.

Clam shell clasp 30 comprises a pair of clam shell leaves 35 that move on hinge 33, fastened to base 31 which is attached to outer flat side 25. Fasteners 37 close leaves 35 after a pole of a poly is placed therewithin.

Figure 2:
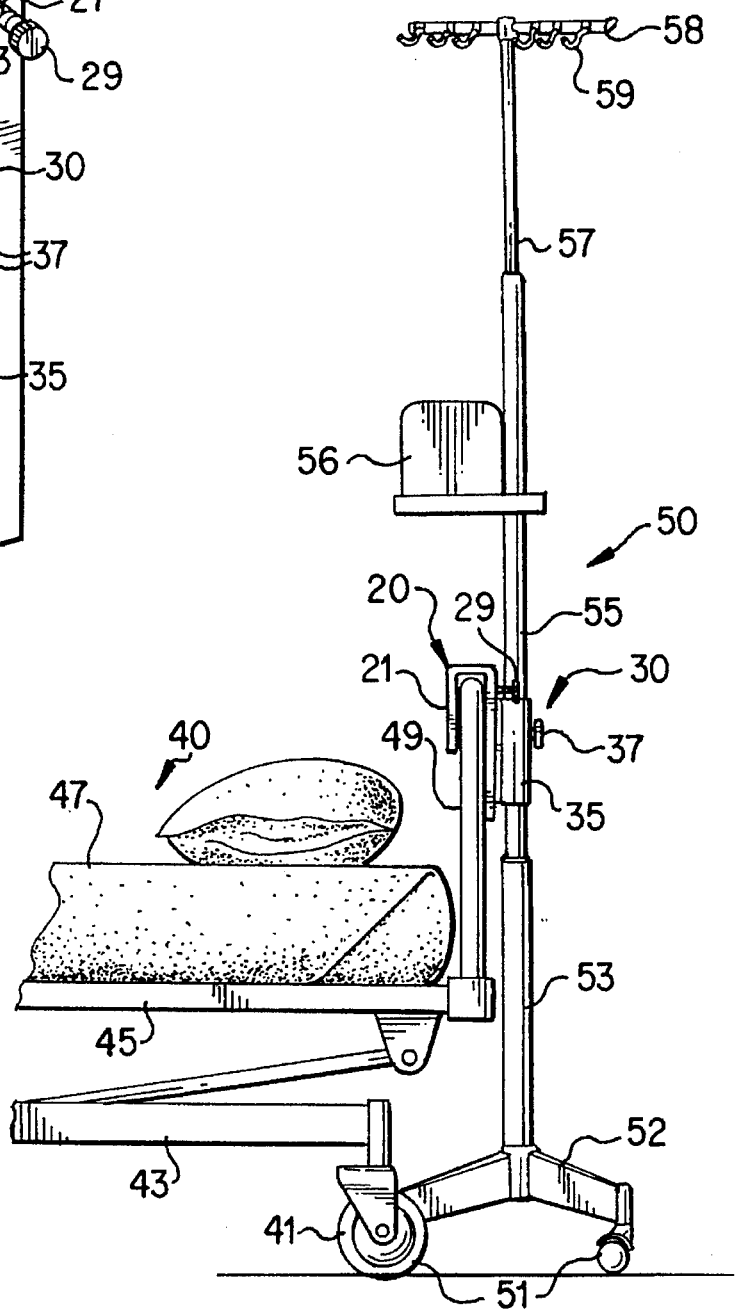
FIG. 2 is a side view of the headboard end of a gurney, a poly which is disposed adjacent thereto, and the attachment device of FIG. 1 which is rigidly interconnecting the gurney and the poly.

In FIG. 2, the head portion of a gurney 40 is shown. Gurney 40 is equipped with wheels 41 on base frame 43 which supports bed frame 45, bed 47, and headboard 49. The device of FIG. 1 rests upon headboard 49, knobs 29 being tightened to hold it securely thereon.

A poly 50 is disposed adjacent to gurney 40. Poly 50 has wheels 51 supporting legs 52 to which base pole 53 is attached. Intermediate pole 55 is disposed and held within pole 53. Volumetric pump 56 is supported by pole 55. Upper pole 57 is disposed within and held by intermediate pole 55 and supports cross bar 58 having a plurality of holding clips 59 thereon. Intermediate pole 55 is clasped within clam shell leaves 35 which are secured by fasteners 37, thereby maintaining poly 50 interconnected to gurney 40.

Figure 3:
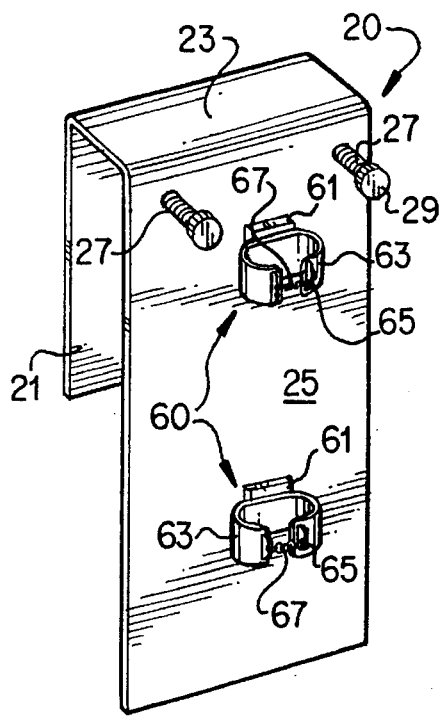
FIG. 3 is an isometric view of another embodiment in which a pair of clips is attached to the longer flat side of the J-shaped member, with their openings longitudinally aligned for receiving the upright pole of a poly, a pair of chains being attached to the clips for enclosing the upright pole.

FIG. 3 shows attachment device 20 equipped with a pair of grasping clips 60, each comprising a base 61, a pair of clip leaves 63, a pin 65, and a chain 67. Each base 61 is rigidly attached to flat outer side 25. Clips 60 are longitudinally aligned so that when device 20 is attached to a footboard or headboard, the pole of a poly is maintained in upright position.

Figure 4:
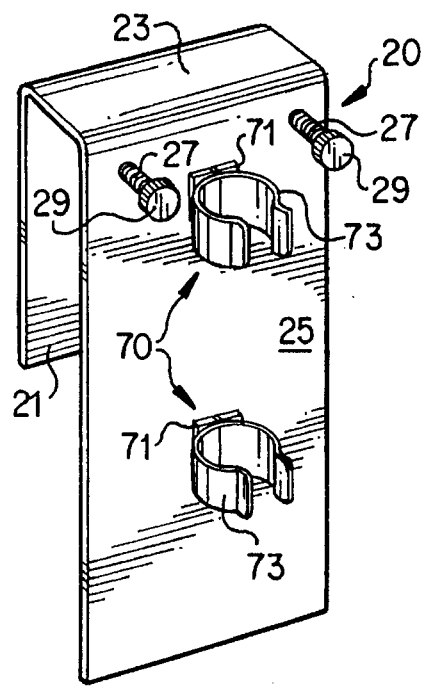
FIG. 4 is an isometric view of still another embodiment in which a pair of spring-loaded clips is attached to the longer flat side of the J-shaped member, with their openings longitudinally aligned for receiving the upright pole of a poly.

FIG. 4 shows an attachment device comprising holding member 20 and a pair of grasping clips 70 which are in longitudinal alignment on outer flat side 25 when member 20 is disposed on a footboard or headboard so that the pole of a poly is held in upright position. Each clip 70 comprises a base 71 which is rigidly attached to outer flat side 25 and resilient clip leaves 73 which enclose and hold a poly pole when it is shoved thereinto.

FIG. 5 shows J-shaped holding member 80 having wide inner flat side 81, narrow top 83, and elongated flat outer side 85 to which a pair of traction clamps 90 are attached in longitudinal alignment when in use. Grasping screws 87, having knurled knobs 86 and holding plates 88, are threadedly attached to flat inner side 81. These clamps 90 are commercially available from Zimcode Traction Components, Catalog No. 1044-06. Other suitable clamps may be substituted. Each clamp 90 comprises base 91, threaded member 92, knurled knob 93, fixed half-clamp 94, and pivotable half-clamp 95.

Figure 6:
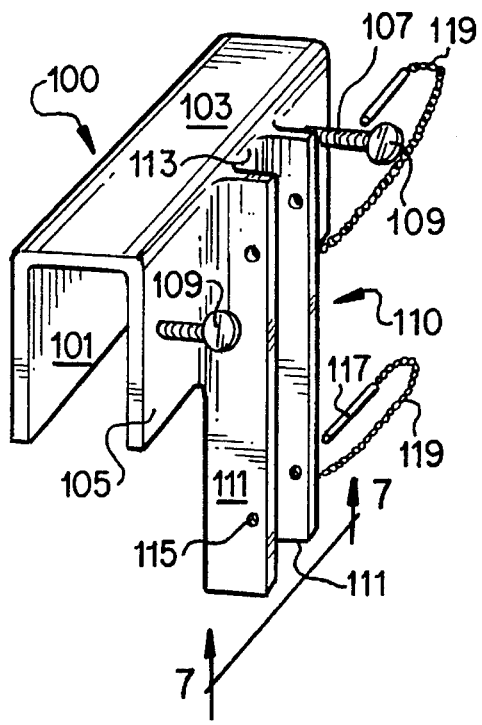
FIG. 6 is an isometric view of an additional embodiment comprising a first U-shaped member that fits over the headboard or footboard of a hospital bed and a second U-shaped member that is cast integrally with the first member and is disposed longitudinally thereto for receiving and clasping the upright pole of a poly, using a pair of chain-attached pins.
Figure 7:
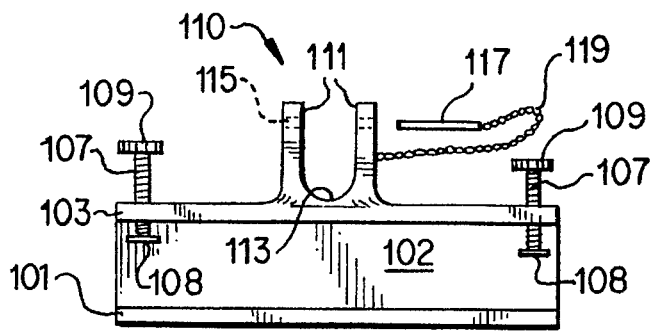
FIG. 7 is a bottom view, taken in the direction of the arrows 7—7 in FIG. 6, of both U-shaped members.

FIGS. 6 and 7 show U-shaped holding member 100 and integrally molded grasping member 110, members 100, 110 being perpendicularly disposed to each other. Member 100 comprises inner flat side 101, top flat side 103, and outer flat side 105. Grasping screws 107 are threadedly attached to flat side 105; they are turned with paddles 109.

Grasping member 110 is also U-shaped and comprises a pair of flat sides 111, semi-circular side 113, a pair of holes 115, and a pair of pins 117 that are held by a pair of chains 119. Pins 117 are inserted into holes 115, whereby a pole of a poly is easily maintained in its upright position.

Figure 9:
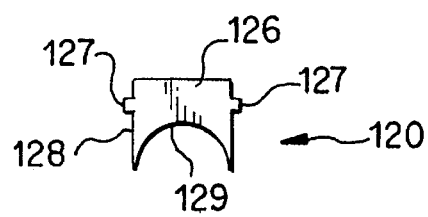
FIG. 9 is a bottom view of a slide member having a pair of opposed lugs that fit within the pair of opposed slots shown in FIG. 8, thereby forming a cylindrical opening for the upright pole of a poly.
Figure 8:
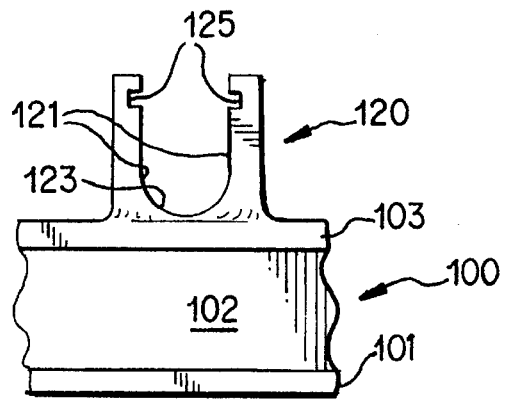
FIG. 8 is a bottom view, similar to FIG. 7, of a second U-shaped member, as another embodiment thereof, having a pair of opposed slots in its sides.

FIGS. 8 and 9 show member 100 and integrally molded grasping member 120 which comprises a pair of flat sides 121, semicircular side 123, a pair of inwardly facing slots 125 in sides 123 near the edges thereof, and slide member 126 having flat sides 128, semicircular side 129 therebetween, and a pair of outwardly facing lugs 127, also near the edges thereof, which fit into slots 125 when slide member 120 is slid longitudinally, after a pole of a poly has been placed against semicircular side 123, to close grasping member 120 and form a cylinder around the pole.

Figure 10:
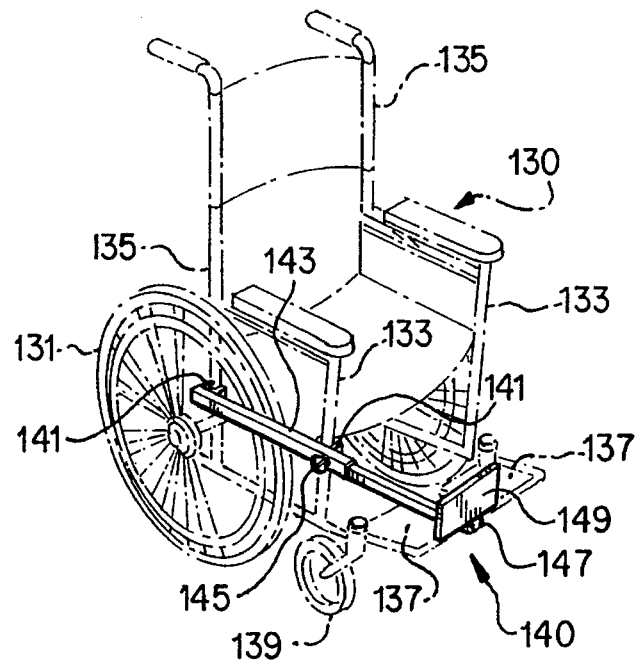
FIG. 10 is an isometric view of a wheelchair in phantom to which an interconnecting sleeve and a selectively extended rod are attached along one side to support a small toeboard at the end of the rod for receiving the attachment device of this invention.

FIG. 10 shows typical wheelchair 130 in phantom, having main wheels 131, frame members 133, 135, foot support boards 137, and pivotable front wheels 139. Sleeve 143 is attached to members 133, 135 with clamps 141. Rod 147 is selectively positioned slideably within sleeve 143 and is held in a selected position with set screw 145. Flat toeboard 149 is rigidly and perpendicularly attached to the outer end of rod 147. Any attachment device 20, 80, 100, 150 of this invention may be positioned over toeboard 149 and secured thereto with screws 27, 87, 107, whereby any poly, such as intermediate pole 55, may be securely held by grasping means 30, 60, 70, 90, 110, 120, 160 while a single medical attendant pushes and guides a patient's stretcher, wheelchair, wheeled bed, or gurney down corridors, up and down inclines, into and out of elevators, and into various rooms.

Figure 11:
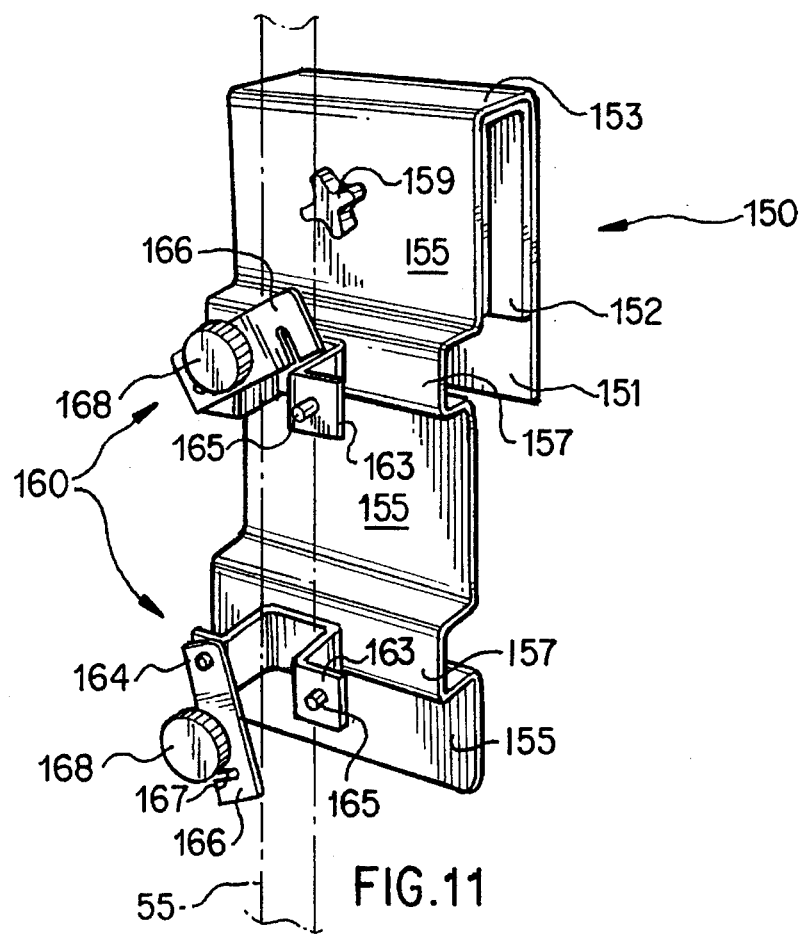
FIG. 11 is an isometric view of a cross-folded embodiment having a pair of stiffening ridges to which a pair of pole clamps are attached.
Figure 12:
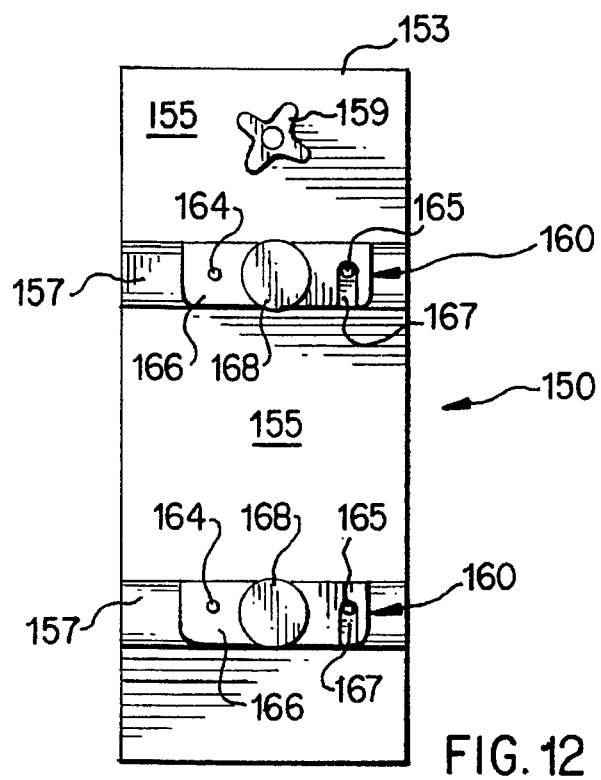
FIG. 12 is a front view of the embodiment seen in FIG. 11.

FIGS. 11 and 12 show cross-folded attachment device 150 comprising inner flat side 151, narrow top side 153, outer flat side 155, cushioning pad 152 for protecting headboard 49, for example, and a pair of cross-folded ridges 157. A flat-sided pole clamp 160 is mounted on the flat outer surface of each ridge 157 and comprises a hat-shaped member having central base 161 which is rigidly attached to that surface and a pair of flat outer leaves 163 straddling base 161 and outwardly spaced therefrom, pivot lug 164 which is perpendicularly attached to one leaf 163, holding lug 165 which is perpendicularly attached to the other leaf 163, and swivel plate 166 which is pivotably fastened to pivot lug 164 at one end thereof and has holding slot 167 in the other end thereof. Positioning knob 168 is also attached to plate 166 for moving it toward lug 165 so slot 167 is thereby engaged and a poly pole 55 may be held uprightly by the pair of pole clamps 160.

While certain embodiments of the invention are disclosed and described herein, it will be apparent that various modifications may be made without departing from the spirit and scope of the invention as defined by the following claims.

What is claimed is:

1. An attachment device for attaching a wheeled auxiliary apparatus, which comprises an upright pole, to a patient transport vehicle, which comprises a horizontally disposed part, for synchronized movement of said apparatus and said vehicle, comprising:

A) a holding member comprising an inner flat side, a top side, and an outer side, said inner and outer sides being spaced apart by an insertion distance, wherein said outer side comprises a pair of stiffening ridges that are spaced apart in parallel and across said outer side, at least one of said inner and outer sides having a width greater than said distance and having at least one threadedly and perpendicularly attached screw for pressing said horizontally disposed part against the other of said sides, whereby said part is thereby rigidly held by said member; and B) a grasping member, attached to said outer side, for grasping said upright pole, said grasping member comprising a pair of pole clamps which are mounted upon said pair of ridges, each said pole clamp comprising:
        1) a hat-shaped member having a central base which is rigidly attached to one said ridge, a pair of flat outer leaves on each side of said base and outwardly spaced therefrom, a pivot lug mounted on one said leaf, and a holding lug mounted on the other said leaf, and
        2) a swivel plate mounted on said pivot lug at one end thereof and having a slot in the other end thereof for engaging said holding lug.

2. A medical attachment device for rigidly connecting an auxiliary medical apparatus having an upright pole to a patient transport vehicle having an elongated and horizontally disposed upright part, comprising:

A) a holding member which comprises:
        1) an inner flat side, an outer side which comprises a pair of cross-folded ridges having flat outer surfaces, and a top side that rigidly connects said inner and outer sides,
        2) at least one holding screw that is threadedly and perpendicularly attached to one of said inner and outer sides for applying pressure upon said upright part and against the other said side when said member is hung upon said upright part; and B) a grasping means, rigidly attached to said outer side, for grasping said upright pole and for maintaining said pole in fixed spatial relationship to said vehicle and in upright position during synchronous movement of said vehicle and said apparatus by a single medical attendant, wherein said grasping means comprises a pole clamp mounted on each said flat outer surface, each said pole clamp comprising:
        1) a hat-shaped member which comprises a central base, a pair of flat outer leaves on each side of said base and spaced outwardly therefrom, a pivot lug which is perpendicularly attached to one said leaf, and a holding lug which is perpendicularly attached to the other said leaf, and
        2) a swivel plate which is pivotably fastened to said pivot lug at one end thereof and has a holding slot in the other end thereof for engaging said holding lug after said upright pole has been inserted into said pair of hat-shaped members.

3. The device of claim 2, wherein vehicle is a hospital bed having a footboard or headboard as said upright part.

4. The device of claim 2, wherein said vehicle is a gurney having a footboard or headboard as said upright part.

5. The device of claim 2, wherein a toeboard attaching means provides said upright part for a wheelchair having frame members, said toeboard attaching means comprising:

A) a sleeve, having an aperture at one end thereof, which is clamped to said frame members on one side of said wheelchair so as to be horizontally disposed;

B) a rod, having inner and outer ends, which is slideably inserted at said inner end into said aperture and fixed in position by a set screw; and C) a toeboard which is rigidly and perpendicularly attached to said outer end of said rod, whereby said holding member can be positioned onto said toeboard and held thereon by said at least one holding screw.

* * * * *